(12) United States Patent
Abhishek et al.

(10) Patent No.: US 10,909,406 B2
(45) Date of Patent: Feb. 2, 2021

(54) IMAGE PROCESSING SYSTEM AND METHOD

(71) Applicant: Newgen Software Technologies Limited, Chennai (IN)

(72) Inventors: Jindal Abhishek, Haryana (IN); Bhatia Sandeep, Mandi (IN); Lal Puja, Chennai (IN); Nemmikanti Prasad, Khammam (IN)

(73) Assignee: NEWGEN SOFTWARE TECHNOLOGIES LIMITED, Chennai (IN)

( * ) Notice: Subject to any disclaimer, the term of this patent is extended or adjusted under 35 U.S.C. 154(b) by 24 days.

(21) Appl. No.: 15/913,966

(22) Filed: Mar. 7, 2018

(65) Prior Publication Data
US 2019/0213433 A1 Jul. 11, 2019

(30) Foreign Application Priority Data
Jan. 8, 2018 (IN) .............................. 201841000718

(51) Int. Cl.
*G06K 9/00* (2006.01)
*G06K 9/38* (2006.01)
*G06T 7/136* (2017.01)

(52) U.S. Cl.
CPC ................ *G06K 9/38* (2013.01); *G06T 7/136* (2017.01); *G06T 2207/20012* (2013.01); *G06T 2207/20021* (2013.01); *G06T 2207/20084* (2013.01); *G06T 2207/30176* (2013.01)

(58) Field of Classification Search
CPC . G06K 9/38; G06T 7/136; G06T 2207/30176; G06T 2207/20084; G06T 2207/20021; G06T 2207/20012
See application file for complete search history.

(56) References Cited

U.S. PATENT DOCUMENTS

| 6,393,150 B1 * | 5/2002 | Lee ........................ G06K 9/38 382/176 |
| 7,636,467 B2 * | 12/2009 | Burian ..................... G06K 9/38 382/154 |
| 8,014,574 B2 * | 9/2011 | Hara ....................... G06K 9/38 382/124 |

(Continued)

*Primary Examiner* — Aaron W Carter
(74) *Attorney, Agent, or Firm* — Harness, Dickey & Pierce, P.L.C.

(57) ABSTRACT

An image processing system adapted to binarize images is provided. The system includes a component detector configured to receive an image and detect a plurality of components in the image. The components are detected based on a content of the image. Further, the system includes a logical splitter configured to split the image into a plurality of windows based on the plurality of components. The plurality of windows is of varying window sizes. In addition, the system includes a threshold detector configured to determine a binarization threshold value for each window. The system also includes a binarization module configured to binarize a plurality of component images based on the corresponding binarization threshold values of the component. Furthermore, the system includes a logical integrator configured to generate a binarized image. The binarized image is a logically integrated image comprising the plurality of component images.

18 Claims, 5 Drawing Sheets

(56) References Cited

U.S. PATENT DOCUMENTS

| | | | | |
|---|---|---|---|---|
| 8,224,114 B2* | 7/2012 | Ma | ............ | G06K 9/40 |
| | | | | 382/275 |
| 9,025,897 B1* | 5/2015 | Elton | ............ | G06T 7/136 |
| | | | | 382/237 |
| 9,367,899 B1* | 6/2016 | Fang | ............ | G06T 7/11 |
| 9,965,695 B1* | 5/2018 | Ming | ............ | G06K 9/38 |
| 2003/0068093 A1* | 4/2003 | Baggs | ............ | G06T 5/20 |
| | | | | 382/261 |
| 2005/0163374 A1* | 7/2005 | Ferman | ............ | G06K 9/00456 |
| | | | | 382/176 |
| 2005/0219581 A1* | 10/2005 | Dobashi | ............ | G06K 9/38 |
| | | | | 358/1.9 |
| 2009/0244564 A1* | 10/2009 | Kondo | ............ | H04N 1/6075 |
| | | | | 358/1.9 |
| 2010/0107061 A1* | 4/2010 | Ramakrishnan | ...... | G06F 40/103 |
| | | | | 715/256 |
| 2011/0222769 A1* | 9/2011 | Galic | ............ | G06K 9/4604 |
| | | | | 382/173 |
| 2012/0082372 A1* | 4/2012 | Mittal | ............ | G06K 9/38 |
| | | | | 382/159 |
| 2012/0120453 A1* | 5/2012 | Yu | ............ | H04N 1/40062 |
| | | | | 358/3.06 |
| 2012/0274991 A1* | 11/2012 | Roy | ............ | H04N 1/387 |
| | | | | 358/462 |
| 2013/0004066 A1* | 1/2013 | Butler | ............ | H04N 1/6027 |
| | | | | 382/165 |
| 2013/0027419 A1* | 1/2013 | Zheng | ............ | H04N 1/40062 |
| | | | | 345/589 |
| 2014/0147036 A1* | 5/2014 | Mutsuo | ............ | G06K 9/38 |
| | | | | 382/164 |
| 2015/0262007 A1* | 9/2015 | Sesum | ............ | G06K 9/00469 |
| | | | | 382/177 |
| 2016/0283818 A1* | 9/2016 | Liu | ............ | G06K 9/4652 |
| 2017/0024629 A1* | 1/2017 | Thrasher | ............ | G06T 7/187 |
| 2017/0078596 A1* | 3/2017 | Chesnokov | ............ | H04N 5/3572 |
| 2017/0109576 A1* | 4/2017 | Shustorovich | ............ | G06K 9/342 |
| 2019/0019055 A1* | 1/2019 | Zhou | ............ | G06K 9/34 |
| 2019/0163995 A1* | 5/2019 | Govindaraj | ............ | G06K 9/00818 |
| 2019/0164003 A1* | 5/2019 | Abhishek | ............ | G06K 9/4604 |
| 2019/0213433 A1* | 7/2019 | Abhishek | ............ | G06K 9/38 |
| 2020/0134794 A1* | 4/2020 | Chesnokov | ............ | G06T 5/006 |

* cited by examiner

IMAGE PROCESSING SYSTEM AND METHOD

PRIORITY STATEMENT

The present application hereby claims priority under 35 U.S.C. § 119 to Indian patent application number 201841000718 filed 8 Jan. 2018, the entire contents of which are hereby incorporated herein by reference.

FIELD

Embodiments of the invention relate generally to image processing systems and more particularly to a system and method for binarization of images.

BACKGROUND

Automatic form processing or scanning is used across business organizations to capture and process data fed into business systems. In general, scanned documents include text, line-drawings and graphic regions. Such information is mostly presented as a color image or a grayscale image. However, in some situations, it may be desired to convert such a color or grayscale image into a binary-valued image, for example, to facilitate document analysis or to reduce the size of the file.

Binarization is a process of transforming a gray scale image to a binary image which includes only two classes of pixels, white as background and black as foreground. Classification is carried out with a separation intensity value called threshold. The task of implementing binarization efficiently can be quite complex. Frequently, the physical dimension of a printed text varies significantly, even on the same page. In most document imaging systems, a binarization process typically precedes the document analyzing procedures.

Various methods have been developed to binarize an image. These methods can be classified into global binarization methods and local binarization methods. In a global binarization method, a single threshold value is determined for the scanned document. This method is fast and provides good results for simple documents. However, such global thresholding algorithms prove to be inappropriate for complex documents. If the illumination over the document is not uniform global binarization methods tend to produce marginal noise along the page borders. To overcome such complexities, local thresholding techniques have been proposed for document binarization. These techniques estimate a different threshold for each pixel according to the gray-scale information of the neighboring pixels.

Many popular local binarization methods are window-based approaches, in which, the local threshold for a pixel is computed from gray level values of the pixels in a window. Various formulas have been proposed for computing such a local threshold.

Currently, both the domains of image binarization, i.e., global thresholding and local thresholding have not been able to deal successfully with all aspects involved in scanned documents and more importantly, resolve the challenges posed by both noise and variable lighting. Single global thresholds may not be effective in case of uneven illumination, scanning errors, poor resolution and complexity of the document structure (content type), which may lead to loss of data and extra noise. Similarly, some of the well-known local thresholding algorithms are very rigid in their approach about computing local statistical functions because they generally operate on fixed (and image-dependent) window sizes. This may further lead to loss of data or introduction of extra noise.

Thus, there is a need for an adaptive binarization technique which can binarize scanned documents more efficiently.

SUMMARY

The following summary is illustrative only and is not intended to be in any way limiting. In addition to the illustrative aspects, example embodiments, and features described, further aspects, example embodiments, and features will become apparent by reference to the drawings and the following detailed description. Example embodiments provide an image processing system and method for binarization of images.

Briefly, according to an example embodiment, an image processing system adapted to binarize images is provided. The system includes a component detector configured to receive an image and detect a plurality of components in the image. The components are detected based on a content of the image. Further, the system includes a logical splitter configured to split the image into a plurality of windows based on the plurality of components. The plurality of windows is of varying window sizes. In addition, the system includes a threshold detector configured to determine a binarization threshold value for each window. The system also includes a binarization module configured to binarize a plurality of component images based on the corresponding binarization threshold values of the component. Furthermore, the system includes a logical integrator configured to generate a binarized image. The binarized image is a logically integrated image comprising the plurality of component images.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Figure 1:
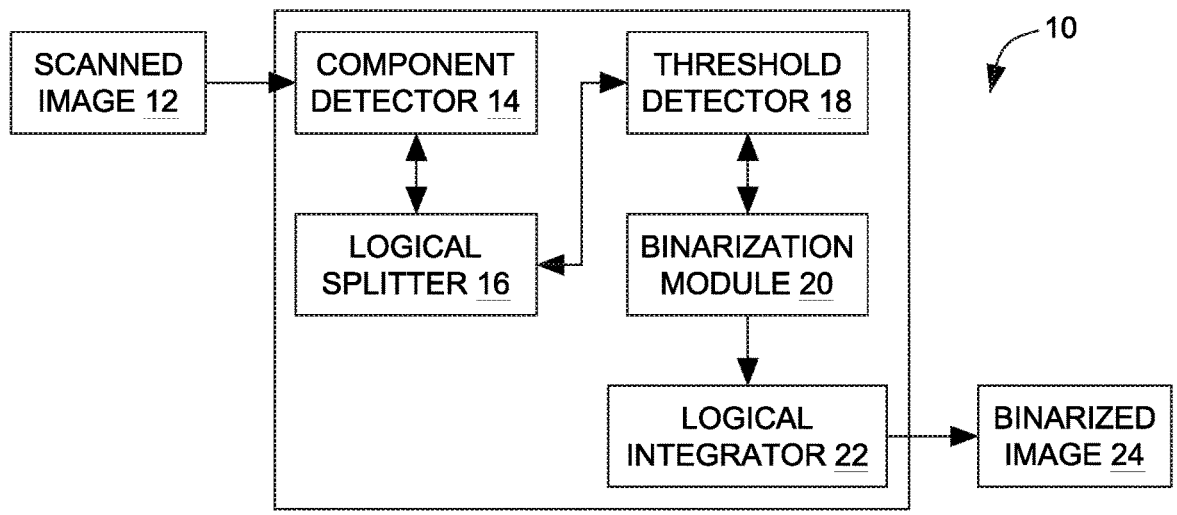
FIG. 1 is a block diagram of one embodiment of an image processing system configured to binarize images, according to the aspects of the present technique.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein.

Accordingly, while example embodiments are capable of various modifications and alternative forms, example embodiments are shown by way of example in the drawings and will herein be described in detail. It should be understood, however, that there is no intent to limit example embodiments to the particular forms disclosed. On the contrary, example embodiments are to cover all modifications, equivalents, and alternatives thereof. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. Inventive concepts may, however, be embodied in many alternate forms and should not be construed as limited to only the example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the scope of inventive concepts.

Spatial and functional relationships between elements (for example, between modules) are described using various terms, including "connected," "engaged," "interfaced," and "coupled". Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The systems described herein, may be realized by hardware elements, software elements and/or combinations thereof. For example, the devices and components illustrated in the example embodiments of inventive concepts may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

At least one example embodiment is generally directed to an image processing system for binarization of images. Example embodiments of the present technique provide a system and method for achieving an adaptive dynamic window local binarization.

FIG. 1 is a block diagram of one embodiment of an image processing system configured to binarize scanned documents, according to aspects of the present technique. The system 10 includes a component detector 14, a logical splitter 16, a threshold detector 18, a binarization module 20 and a logical integrator 22. Each component is described in further detail below.

Component detector 14 is configured to receive a scanned document 12. In one embodiment, the scanned document 12 comprises text data and/or non-text data. Non-text data may include line-drawings, graphic regions, pictorial representations and the like. Such information is mostly presented as a color image or a grayscale image. In one embodiment, the component detector 14 is further configured to detect a plurality of components present in the scanned document 12.

In one embodiment, edge detection techniques are used to analyze and detect different components present in the scanned document. In an embodiment, the points at which brightness of the scanned document changes sharply are typically organized into a set of curved line segments. Such curved line segments are represented as edges. Further, edge detection filters are applied to remove background noise in the scanned document. The filters are configured to produce white pixels wherever an edge is detected, thus reducing the background noise.

It may be noted that the edge detection techniques used herein, are generic image processing techniques. One of the various methods which may be used for edge detection is canny edge detection algorithm. In this algorithm, a gaussian filter is applied to remove the noise. Further, the intensity gradient is determined and double threshold is applied to determine potential edges. Furthermore, the detection of the edges is determined by suppressing weak and non-connecting edges.

Logical splitter 16 is configured to logically split the scanned document into a plurality of windows. The plurality of windows is determined based on the plurality of components. It may be noted the plurality of windows are of varying sizes. The size of each window depends upon the component detected. More specifically, in the given embodiment, the window size is determined based on a component height, a component width, a stroke width and a standard deviation of pixel intensity of the corresponding component. In a further embodiment, the window size for each component is determined using neural networks.

Threshold detector 18 is configured to determine a binarization threshold value for each window. In an embodiment, the binarization threshold value is based on size of the windows. In one embodiment, the binarization threshold value is computed using local mean and local standard deviation.

Binarization module 20 is configured to binarize a plurality of component images based on the corresponding binarization threshold values of the component. In one embodiment, the binarization module 20 coupled with the threshold detector 18 uses the threshold values for determining the binarization algorithm.

Logical integrator 22 is configured to generate a binarized image 24. The binarized image 24 is generated by logically combining the binarized windows for each component. Since the threshold value is based on the component, the binarized image thus generated is of greater clarity. The manner in which components and windows are formed in a scanned document is described in further detail below.

Figure 2A:
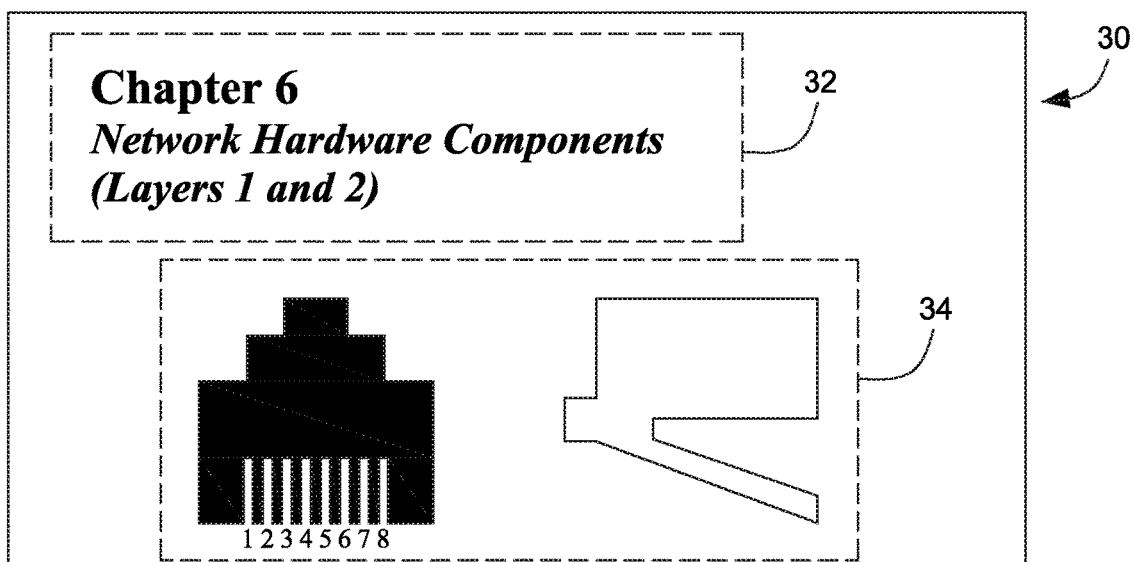
FIG. 2A is an example scanned image of a document received by an image processing system, according to the aspects of the present technique.

FIG. 2A is an example scanned document received by an image processing system as described above. Scanned document 30 includes text data 32 and non-text data 34. As used herein, text data may include alphabets, numbers, special characters, symbols, etc. and non-text data may include line-drawings, pictures, charts, graphic regions and the like. In addition, the image content may be classified based on font size, font type and the like. The manner in which components are detected in scanned document 30 is described in further detail below.

Figure 2B:
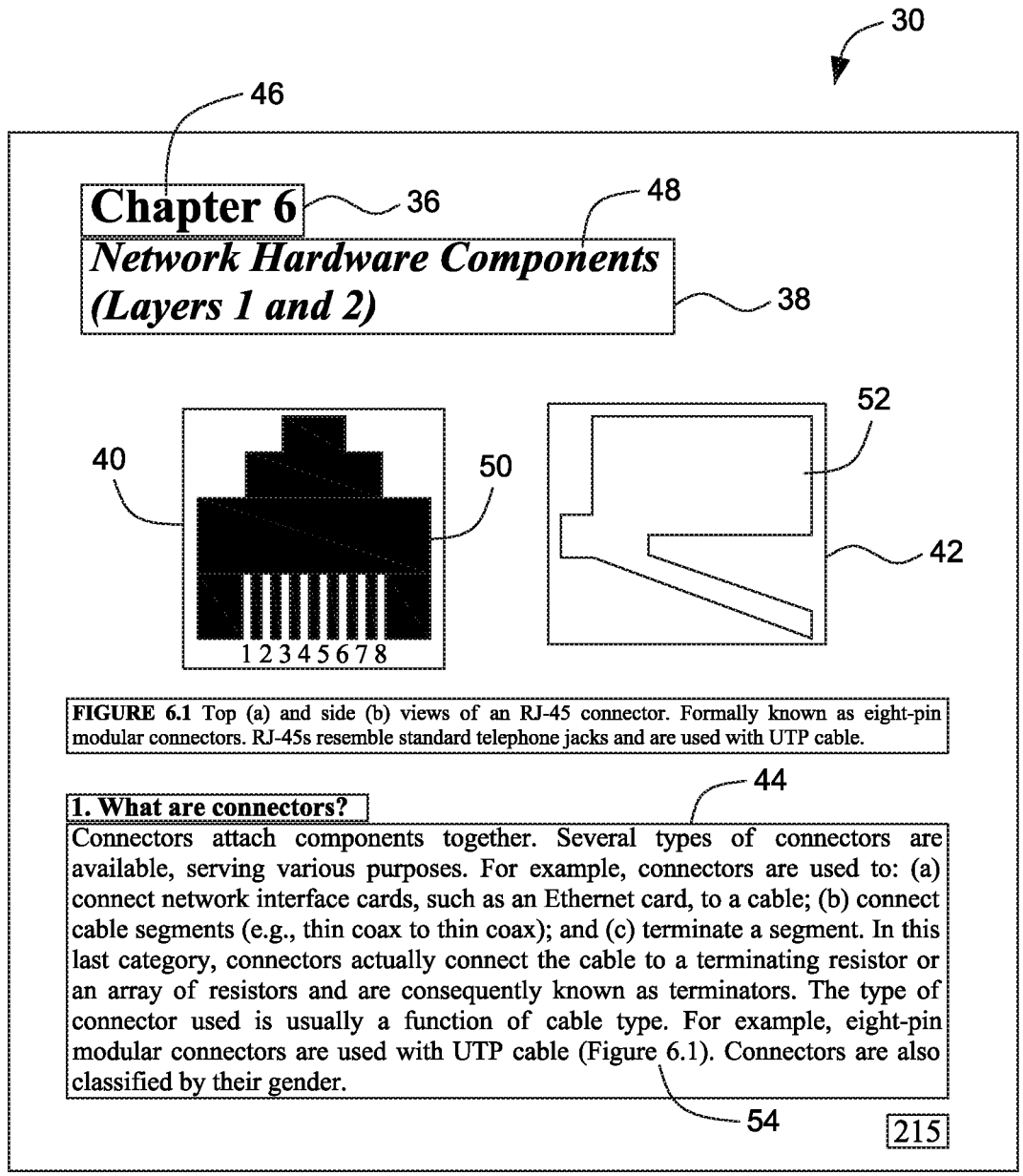
FIG. 2B is an example scanned document illustrating a plurality of components, according to the aspects of the present technique.

FIG. 2B is an example scanned document illustrating a plurality of components, according to the aspects of the present technique. The scanned document 30 comprises text and non-text data as described above. Further, components 46, 48, 50, 52 are detected in the scanned document 30. In one embodiment, the plurality of the components is analyzed and detected based on content type. In an embodiment, edge detection technique is used to analyze and detect different components based on content of the image. In addition, the image content may also be classified based on font size, font type and the like.

In the given example embodiment, once the components (46, 48, 50, 52) are detected, a window size is determined for each corresponding component. Such dynamically computed windows are illustrated as 36, 38, 40,42 and 44 in the scanned document 30. In this example embodiment, window size for each component is determined by training sample images using neural networks.

Further, the window size is determined based on component height, component width, stroke width and standard deviation of pixel intensity of the corresponding component. The manner in which the scanned image is analyzed and binarized is described in a flow diagram below.

Figure 3:
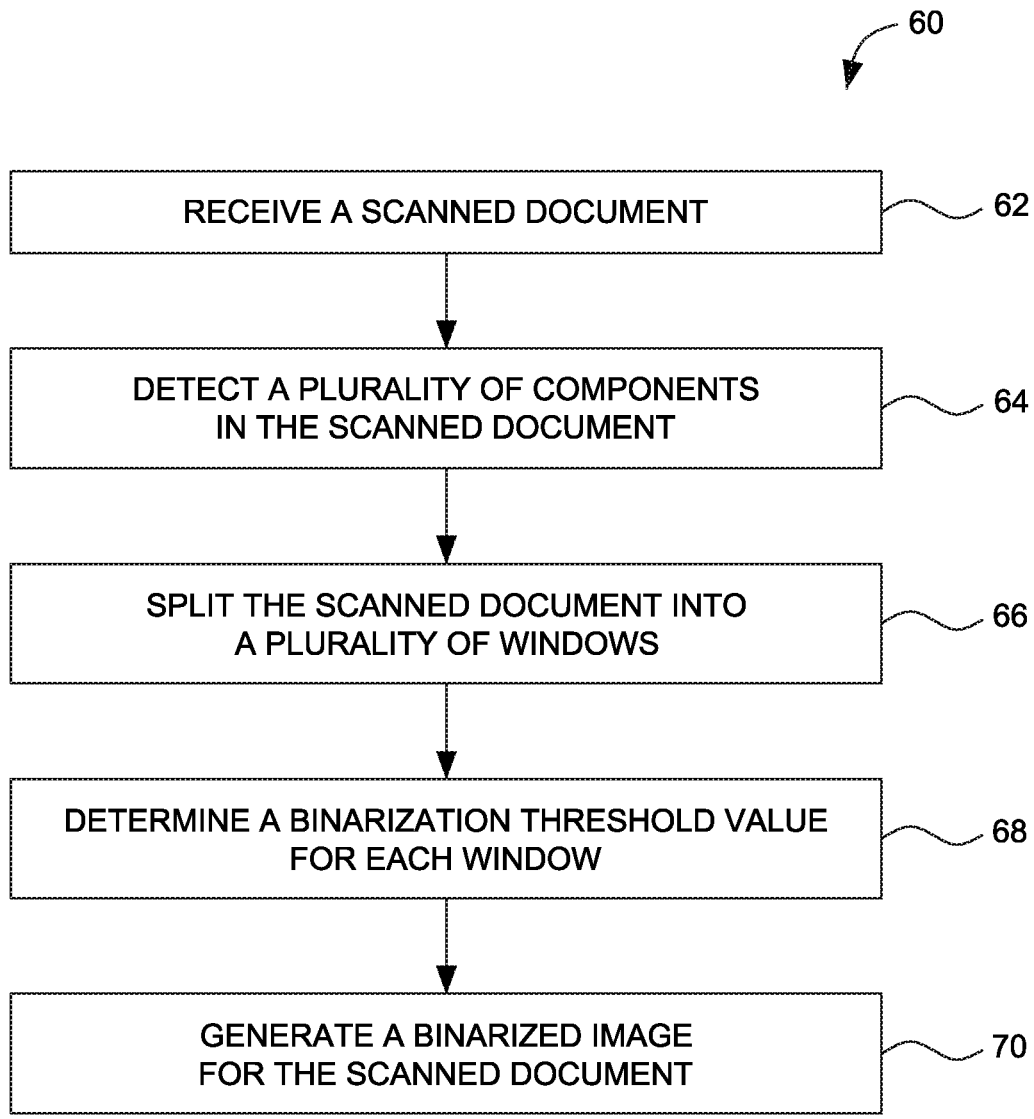
FIG. 3. is a flow diagram illustrating a process to binarize the image, according to the aspects of the present technique.

FIG. 3. is a flow diagram 60 illustrating one embodiment of a process for binarizing a scanned document, according to the aspects of the present technique. The binarization technique includes setting threshold values for windows of varying sizes thus increasing the quality of the scanned document. Each step in the process for binarizing the scanned document is described in further detail below.

At step 62, a scanned document is received. As used herein, the scanned document may include scanned images of application forms, administrative documents, financial documents, and the like. In one embodiment, the scanned document comprises text data and/or non-text data or combinations thereof. Non-text data include line-drawings, graphic regions and the like. The scanned document is mostly presented as a color image or a grayscale image.

At step 64, a plurality of components is detected in the scanned document. In one embodiment, edge detection techniques are used to analyze and detect different components present in the scanned document. Further, edge detection filters are applied to remove background noise in the scanned document. The filters are configured to produces white pixels wherever an edge is detected, thus reducing the background noise.

At step 66, the scanned document is logically split into a plurality of windows. The plurality of windows is determined based on the plurality of components. It may be noted the plurality of windows are of varying sizes. The size of each window depends upon the component detected. More specifically, in the given embodiment, the window size is determined based on a component height, a component width, a stroke width and a standard deviation of pixel intensity of the corresponding component.

At step 68, a binarization threshold value for each window is determined. In an embodiment, the binarization threshold value is based on size of the windows. In one embodiment, the binarization threshold value is computed using local mean and local standard deviation in accordance with the relationship:

$$T = (\text{mean}) + k^* (\text{standard deviation}) \quad \text{(Equation (1))}$$

Where k is a constant value, varying from 0 to 1.
In one embodiment, 'k' is computed using the following relation:

$$k = -0.03 * (d\text{GlobalSumStd} - d\text{LocalSumStd})/\text{MAX}(d\text{GlobalSumStd}, d\text{LocalSumStd})$$

Where, dGlobalSumStd=(global mean*global standard deviation)
dLocalSumStd=(local standard deviation)

At step 70, a binarized image is generated for the scanned document. The binarized image which is combination of smaller portions of binarized images corresponding to each component is generated. In one embodiment, the binarized image is generated for each component based on binarization threshold value of the component. In one embodiment, the window size is computed for each component is using neural networks. The manner in neural networks are used to compute window sizes is described in further detail below.

Figure 4:
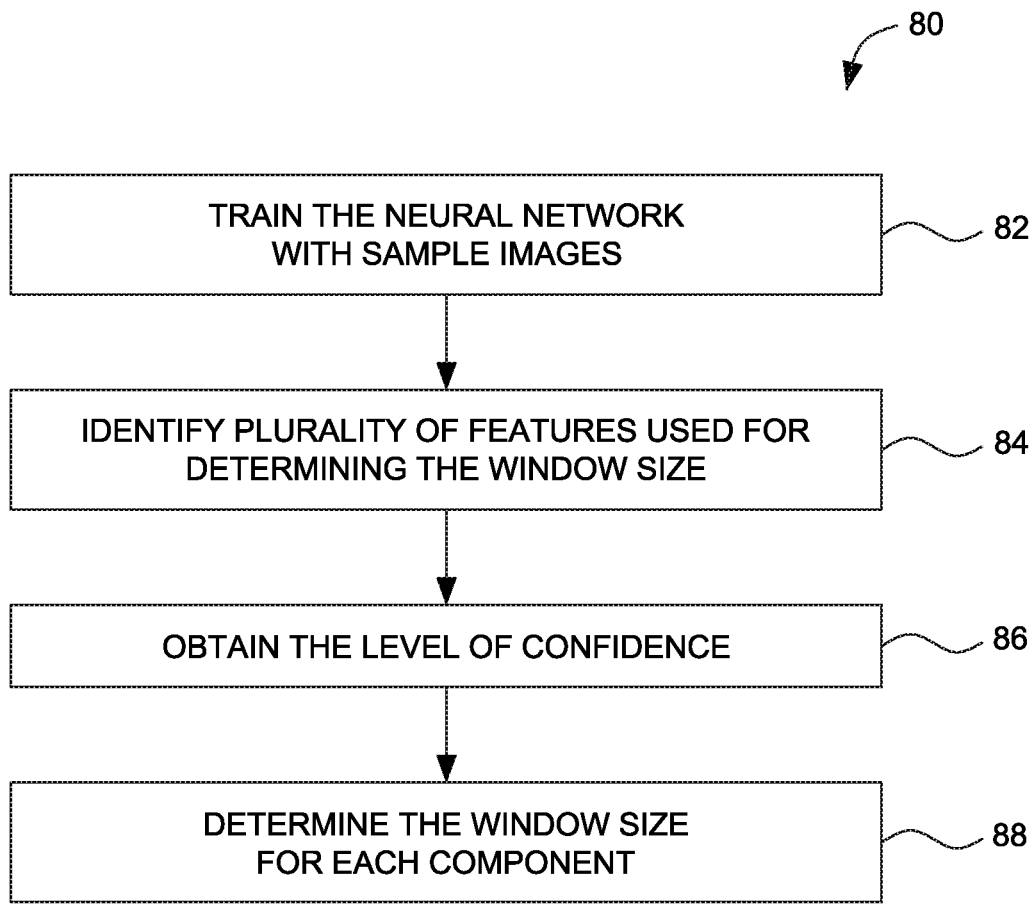
FIG. 4. is a flow diagram illustrating a process to determine the optimal window size for a component, according to the aspects of the present technique.

FIG. 4. is a flow chart 80 illustrating one embodiment of a process to determine a window size for a component in a scanned document, according to the aspects of the present technique. In this specific embodiment, the window size for each component is calculated using neural networks. Each step is described in further detail below.

At step 82, sample images are used as training images in a neural network. In one embodiment, a database of sample images is created. Further the database is used to train the neural networks and test a performance against several use cases.

At step 84, a plurality of features of the component are identified. Such features may include component height, component width, stroke width and standard deviation of pixel intensity of each component. The window size is determined based on the features identified for each component of the image. In an example embodiment, component feature such as component height is used in determining the window size of the corresponding component. For example, for a component having height h, window size may vary from $$3*3 \text{ to } (2n+1) \text{ where } 2n+1 \quad \text{Equation (3)}$$

is the nearest natural number to h and h≥3

At step 86, a confidence of the extracted image data is obtained for each of the one or more components. In an example embodiment, a window size for which accuracy (maximum confidence with respect to actual component data) is maximum is determined as an optimal window size for that component. In yet another embodiment, the window size may be determined based on a stroke width of the corresponding component. In addition, the window size may be determined based on a standard deviation of a pixel intensity of the corresponding component.

At step 88, the window size is computed by gradually growing it until the value reaches the image height or width, thus obtaining a parameter free algorithm. The component features such as component width, component height, stroke width and standard deviation are fed as input data to neural networks to determine the optimal window size for each corresponding component.

Figure 5:
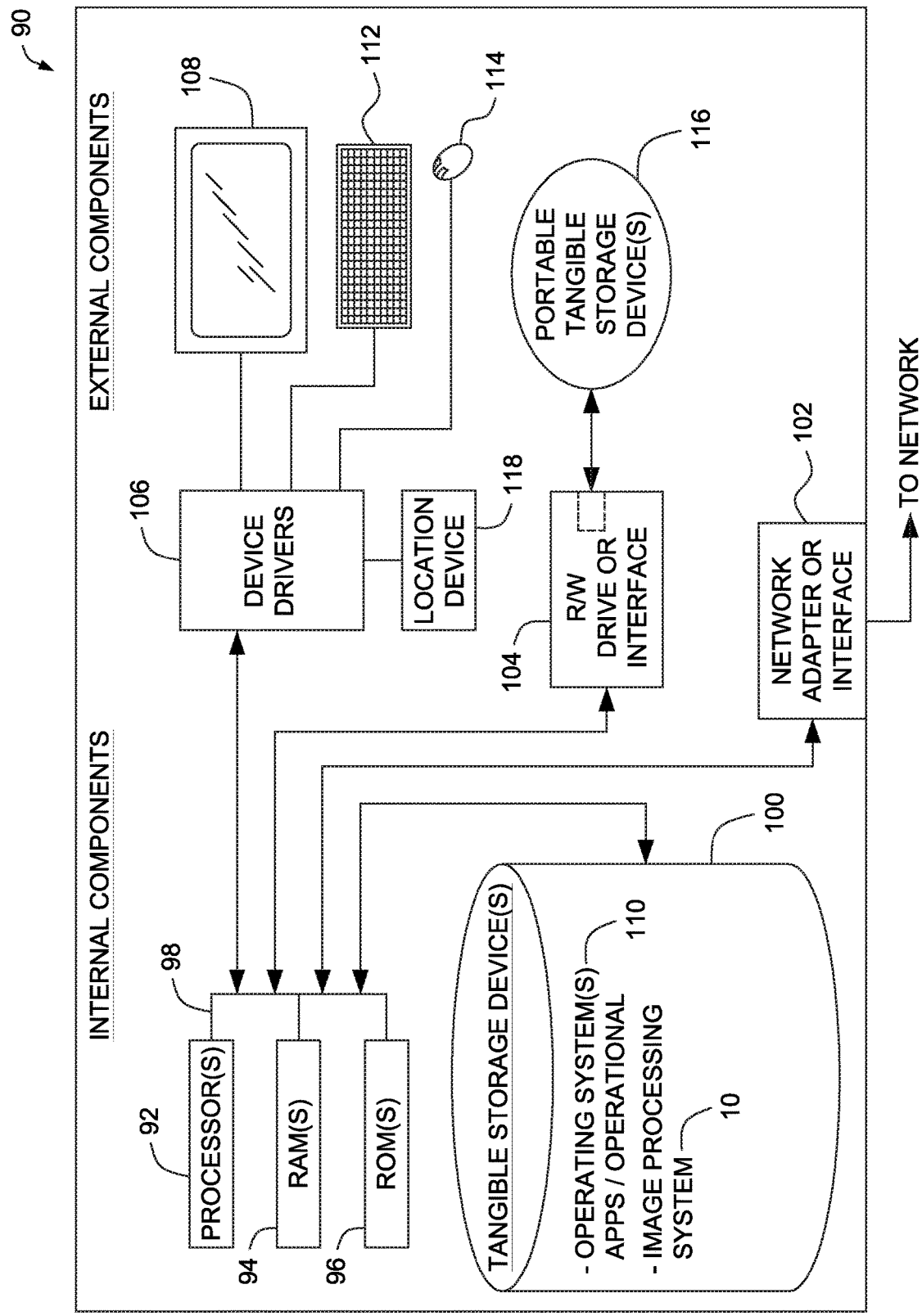
FIG. 5. is a block diagram of an embodiment of a computing device in which the modules of the image processing system, described herein, are implemented.

The modules of the image processing system 10 described herein are implemented in computing devices. One example of a computing device 90 is described below in FIG. 5. The computing device includes one or more processor 92, one or more computer-readable RAMs 94 and one or more computer-readable ROMs 96 on one or more buses 98. Further, computing device 90 includes a tangible storage device 100 that may be used to execute operating systems 110 and the image processing system 10. The various modules of the image processing system 10 including a component detector 14, a logical splitter 16, a threshold detector 18, a binarization module 20 and a logical integrator 22 may be stored in tangible storage device 100. Both, the operating system 110 and the system 10 are executed by processor 92 via one or more respective RAMs 94 (which typically include cache memory). The execution of the operating system 110 and/or the system 10 by the processor 92, configures the processor 92 as a special purpose processor configured to carry out the functionalities of the operation system 110 and/or the image processing system 10, as described above.

Examples of storage devices 100 include semiconductor storage devices such as ROM 96, EPROM, flash memory or any other computer-readable tangible storage device that may store a computer program and digital information.

Computing device also includes a R/W drive or interface 104 to read from and write to one or more portable computer-readable tangible storage devices 116 such as a CD-ROM, DVD, memory stick or semiconductor storage device. Further, network adapters or interfaces 102 such as a TCP/IP adapter cards, wireless Wi-Fi interface cards, or 3G or 4G wireless interface cards or other wired or wireless communication links are also included in computing device.

In one example embodiment, the image processing system 10 which includes a component detector 14, a logical splitter 16, a threshold detector 18 a binarization module 20 and a logical integrator 22, may be stored in tangible storage device 100 and may be downloaded from an external computer via a network (for example, the Internet, a local area network or other, wide area network) and network adapter or interface 102.

Computing device further includes device drivers 106 to interface with input and output devices. The input and output devices may include a computer display monitor 108, a keyboard 112, a keypad, a touch screen, a computer mouse 114, and/or some other suitable input device.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

While only certain features of several embodiments have been illustrated, and described herein, many modifications and changes will occur to those skilled in the art. It is, therefore, to be understood that the appended claims are intended to cover all such modifications and changes as fall within the true spirit of inventive concepts.

The afore mentioned description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the example embodiments is described above as having certain features, any one or more of those features described with respect to any example embodiment of the disclosure may be implemented in and/or combined with features of any of the other embodiments, even if that combination is not explicitly described. In other words, the described example embodiments are not mutually exclusive, and permutations of one or more example embodiments with one another remain within the scope of this disclosure.

The invention claimed is:

1. An image processing system adapted to generate a binarized image for a scanned document, the image processing system comprising:
    a memory having computer readable instructions stored thereon; and
    at least one processor configured to execute the computer readable instructions to,
        receive a non-binarized image,
        detect a plurality of components in the non-binarized image, the plurality of components detected based on edge detection performed on content included in the non-binarized image, the edge detection including applying an edge detection filter to remove background noise from the non-binarized image,
        split the non-binarized image into a plurality of windows based on the plurality of components, the plurality of windows having varying window sizes,
        determine a binarization threshold value for each window based on a local mean and a local standard deviation of the corresponding window, the binarization threshold value for each window is determined using T=(*the local mean)+k*(the local standard deviation), where T=the binarization threshold value, and k is a constant value varying from 0 to 1,
        binarize a plurality of component images from the plurality of windows based on the corresponding binarization threshold values of the plurality of windows, and
        generate a binarized image, the binarized image being a logically integrated image comprising the binarized plurality of component images.

2. The image processing system of claim 1, wherein the content of the non-binarized image comprises text data.

3. The image processing system of claim 1, wherein the content of the non-binarized image comprises non-text data.

4. The image processing system of claim 1, wherein the binarization threshold value of each window is based on a corresponding window size.

5. The image processing system of claim 3, wherein the window size is determined based on the corresponding image component.

6. The image processing system of claim 4, wherein each window size is determined based on a component height and a component width of the corresponding image component.

7. The image processing system of claim 4, wherein each window size is determined based on a stroke width of the corresponding image component.

8. The image processing system of claim 4, wherein each window size is determined based on a standard deviation of a pixel intensity of the corresponding image component.

9. The image processing system of claim 1, wherein the at least one processor is further configured to implement a neural network.

10. The image processing system of claim 1, wherein the at least one processor is further configured to perform the removing background noise from the non-binarized image by producing white pixels wherever an edge is detected in the non-binarized image.

11. The image processing system of claim 1, wherein the at least one processor is further configured to determine the k value using:

$$k=-0.03*(d\text{GlobalSumStd}-d\text{LocalSumStd})/\text{MAX}(d\text{GlobalSumStd},d\text{LocalSumStd}),$$

wherein dGlobalSumStd=(a global mean value*a global standard deviation), and dLocalSumStd is the local standard deviation.

12. A method to generate a binarized image for a scanned document, the method comprising:

receiving, using at least one processor, a non-binarized image;

detecting, using the at least one processor, a plurality of components in the non-binarized image, the plurality of components detected based on edge detection performed on content included in the non-binarized image, the edge detection including applying an edge detection filter to remove background noise from the non-binarized image;

splitting, using the at least one processor, the non-binarized image into a plurality of windows based on the plurality of components, the plurality of windows having varying window sizes;

determining, using the at least one processor, a binarization threshold value for each window based on a local mean and a local standard deviation of the corresponding window, and the binarization threshold value for each window is determined using T=(*the local mean)+k*(the local standard deviation), where T=the binarization threshold value, and k is a constant value varying from 0 to 1, binarizing, using the at least one processor, a plurality of component images from the plurality of windows based on the corresponding binarization threshold values of the plurality of windows; and generating, using the at least one processor, a binarized image, the binarized image being a logically integrated image comprising the binarized plurality of component images.

13. The method of claim 12, wherein the removing background noise from the non-binarized image further includes:

producing white pixels wherever an edge is detected in the non-binarized image.

14. The method of claim 12, wherein the content of the non-binarized image comprises non-text data.

15. The method of claim 12, wherein the binarization threshold value of each window is based on a corresponding window size.

16. The method of claim 15, wherein the window size is determined based on the corresponding image component.

17. The method of claim 15, wherein each window size is determined based on a component height and a component width of the corresponding image component.

18. The method of claim 15, wherein each window size is determined based on a stroke width of the corresponding image component.

* * * * *